No. 779,058.

Patented January 3, 1905.

UNITED STATES PATENT OFFICE.

SAMUEL W. VAUGHEN, OF LORAIN, OHIO, AND JOHN W. CABOT, OF JOHNSTOWN, PENNSYLVANIA.

PROCESS OF RECOVERING METALLIC COMPOUNDS FROM SOLUTIONS.

SPECIFICATION forming part of Letters Patent No. 779,058, dated January 3, 1905.

Application filed September 20, 1901. Serial No. 75,778.

*To all whom it may concern:*

Be it known that we, SAMUEL W. VAUGHEN, residing at Lorain, in the county of Lorain and State of Ohio, and JOHN W. CABOT, residing at Johnstown, in the county of Cambria, in the State of Pennsylvania, citizens of the United States, have invented certain new and useful Improvements in Processes for the Recovery of Metallic Compounds from Solutions; and we do hereby declare the following to be a full, clear, and exact description of the invention, such as will enable others skilled in the art to which it appertains to follow and use the same.

This invention relates to the recovery of metallic compounds from their solutions; and it consists in the novel process or art hereinafter set forth.

In the recovery of the useful elements contained in various waste slags and cinders from solutions of the mixed salts of the elements as described in Patent No. 669,019, granted to S. W. Vaughen, we find it desirable and convenient to be able to separate the metals (especially iron and manganese) from the solution containing the whole quantity of soluble elements in an early stage of the operation.

It is important for us to have the solution containing the alumina and magnesia free of iron and manganese before we proceed to recover the alumina and magnesia. The iron and manganese so separated should also be free from phosphorus, so that they will be suitable for the manufacture of manganese ferro and pig metals. In order to accomplish this and at the same time leave the residual solution of the other elements free of any metals precipitable with ferrocyanids or ferricyanids of the alkalies, we proceed as follows: To the solution of mixed salts (commonly sulfates) of the elements we add a solution of a ferro or ferri cyanid of an alkali. We commonly use ferro or ferri cyanid of potash or soda. A slight excess is generally employed. This precipitates the metals, especially iron and manganese, as ferro or ferri cyanid of iron and manganese. We do not confine ourselves to the metals iron and manganese, but may include any element precipitable by ferro or ferri cyanids. The continued description of our process as applied to the metals iron and manganese is as follows: The products resulting from the above reaction are insoluble ferro or ferri cyanid of iron and manganese and a residual solution of salt of the alkali used. If the iron and manganese sulfates are treated with a ferro or ferri cyanid of potash, the products will be ferro or ferri cyanid of iron and manganese and a solution of potash sulfate. When chlorid solutions of the metals are used with the same precipitant, the residual liquor will contain the potash in the form of chlorid. We next separate the precipitated ferro or ferri cyanid from the residual liquor and then proceed to treat it with a solution of caustic alkali, preferably at the boiling temperature, which we find will transform the ferro or ferri cyanid into the oxyhydrates of the metals, at the same time regenerating and reconstructing the ferro or ferri cyanid of the alkali originally used in the precipitation. We determine by analysis the quantity of metal contained as a base in the ferrocyanid and then provide sufficient caustic alkali to replace the metallic element in the compound by the alkaline element of the caustic alkali used. The strength of the solution of caustic alkali used is preferably from 20° to 40° Baumé. If the ferro or ferri cyanid of the metals is treated with caustic potash, the resulting products will be the oxyhydrates of the metal and a solution of regenerated ferro or ferri cyanid of potash. These solid and liquid products are again separated by any suitable means, such as decantation and filtration. The liquid is then available for use in precipitating a fresh portion of metals from the solution, as previously described, the same precipitant being thus used over and over and regenerating at each operation. The recovered metallic oxyhydrates are in useful form for many purposes in the arts, such as for pigments, for smelting in blast-furnaces, &c. The original solution of mixed salts operated upon is freed from metallic salts, which are injurious to the other products reclaimed. In order to clear the solution from the before-mentioned slight excess of the ferro or ferri cyanid precipitant used, we add to it a slight excess of zinc salt, which neutralizes the ferro or ferri cyanid of alkali and produces a slight precipitate of zinc ferro or ferri cyanid, which we filter off and treat in the same way as just described for the iron and manganese salts, recovering the ferro or ferri cyanid of the alkali and getting back the zinc salt as an oxyhydrate of zinc.

In precipitating the iron or manganese we find it convenient to use a weight of the ferrocyanid of potash about equal to or preferably a little more than the weight of the sulfate of iron or other iron compound present in the solution, (determined by analysis,) the same being true with regard to the manganese salt. It is best to precipitate the solution at the boiling temperature, although we may do so in the cold.

We do not confine ourselves to the recovery of iron and manganese, but may apply our process to the precipitation of any metals precipitable by ferro or ferri cyanids of the alkalies.

Having thus described our improved process, what we claim as new, and desire to obtain Letters Patent upon, is—

1. In the recovery of metallic compounds from solutions of their salts, the process of precipitating them as iron cyanids by mixing such solutions with a solution of the iron cyanids of an alkali, separating the precipitated solids from the residual liquid, recovering the residual salt of the alkali produced by the iron cyanid used from the residual solution, transforming the precipitated iron cyanids into oxyhydrates by treating them with caustic alkali, simultaneously recovering and reconstructing the iron cyanids of the alkali originally used, and finally, precipitating the excess of precipitant in the original solution by adding to the solution first operated upon, a soluble zinc salt, and separating and recovering the zinc iron cyanid thereby produced from the containing liquor, substantially as specified.

2. In the recovery of metallic compounds from solutions of their salts, the process of precipitating them as iron cyanids by mixing such solution with a solution of the iron cyanid of an alkali, separating the precipitated solids from the residual liquid, recovering the residual salt of the alkali produced by the iron cyanid used from the residual solution, transforming the precipitated iron cyanids into oxyhydrates by treating them with caustic alkali, simultaneously recovering and reconstructing the iron cyanids of the alkali originally used, and finally precipitating the excess of precipitant in the original solution by adding to the solution first used a neutralizer consisting of a soluble salt of a metal precipitable as an iron cyanid thereof by an iron cyanid of the alkalies, substantially as specified.

In testimony whereof we affix our signatures in presence of two witnesses.

SAMUEL W. VAUGHEN.
  JOHN W. CABOT.

Witnesses for S. W. Vaughen:
 A. J. BOYNTON,
 J. A. DANIEL.

Witnesses for J. W. Cabot:
 C. McELROY,
 JAS. E. TATNALL.